United States Patent [19]
Lahtinen et al.

[11] Patent Number: 6,012,386
[45] Date of Patent: Jan. 11, 2000

[54] BEARING CONTROL SYSTEM FOR A ROLL WITH HYDROSTATIC BEARINGS

[75] Inventors: Juha Lahtinen, Jyväskylä ; Pekka Kivioja, Muurame; Vesa Nokelainen, Haaraniemi; Kari Holopainen, Muurame; Juha Ehrola, Vaajakoski, all of Finland

[73] Assignee: Valmet Corporation, Helsinki, Finland

[21] Appl. No.: 09/171,163

[22] PCT Filed: Jan. 28, 1998

[86] PCT No.: PCT/FI98/00087

§ 371 Date: Oct. 14, 1998

§ 102(e) Date: Oct. 14, 1998

[87] PCT Pub. No.: WO98/36185

PCT Pub. Date: Aug. 20, 1998

[30] Foreign Application Priority Data

Feb. 14, 1997  [FI]  Finland ..................................... 970625
Sep. 22, 1997  [FI]  Finland ..................................... 973743

[51] Int. Cl.[7] .............................. B30B 3/04; D21G 1/02; F16C 27/00
[52] U.S. Cl. .............................. 100/47; 72/245; 100/170; 384/99; 384/116; 384/117
[58] Field of Search ..................................... 100/168–170, 100/47; 72/245; 384/99, 116, 117

[56] References Cited

U.S. PATENT DOCUMENTS

| | | | |
|---|---|---|---|
| 1,499,332 | 7/1924 | Baumann | 384/99 |
| 3,347,157 | 10/1967 | Kemp | 100/170 |
| 3,679,272 | 7/1972 | Costa et al. | 384/99 |
| 4,041,752 | 8/1977 | Dolenc et al. | |
| 4,530,227 | 7/1985 | Schlatter et al. | 72/245 |
| 4,627,746 | 12/1986 | Grisel et al. | 384/99 |
| 4,704,879 | 11/1987 | Christ et al. | |
| 4,905,598 | 3/1990 | Thomas et al. | |
| 4,910,842 | 3/1990 | Brendel | 100/170 |
| 5,022,318 | 6/1991 | Alich | 100/47 |
| 5,201,586 | 4/1993 | Zimmermann et al. | |
| 5,360,273 | 11/1994 | Buckmann | 384/99 |
| 5,382,096 | 1/1995 | Stein et al. | |
| 5,584,463 | 12/1996 | Swann et al. | 384/99 |

FOREIGN PATENT DOCUMENTS

| | | |
|---|---|---|
| 0158051 | 4/1988 | European Pat. Off. . |
| 1382268 | 11/1964 | France . |
| 4319579 | 12/1994 | Germany . |
| 373417 | 5/1972 | Sweden . |
| 1558490 | 1/1980 | United Kingdom . |

*Primary Examiner*—Stephen F. Gerrity
*Attorney, Agent, or Firm*—Steinberg & Rashin, P. C.

[57] ABSTRACT

A bearing control system for a roll with hydrostatic bearings which is mounted by its axle on a bearing block or other equivalent frame member by hydraulically loaded hydrostatic bearing elements. A principal bearing element acts in a principal loading direction and another bearing element is a backup bearing element which acts in a direction opposite to the principal loading direction. The bearing elements include bearing shoes positioned freely around the axle in order to support the axle so that the roll revolves freely in relation to the bearing block or other frame member. The control system feeds a hydraulic pressure medium to the hydrostatic bearing elements so that the roll is displaceable in the principal loading direction, e.g., in the direction of the nip plane, by displacing the axle via the bearing elements.

22 Claims, 12 Drawing Sheets

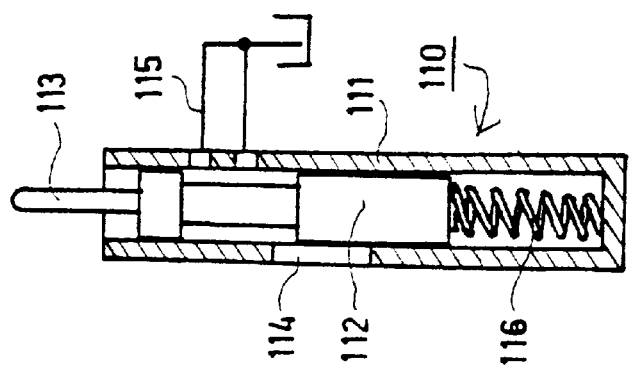
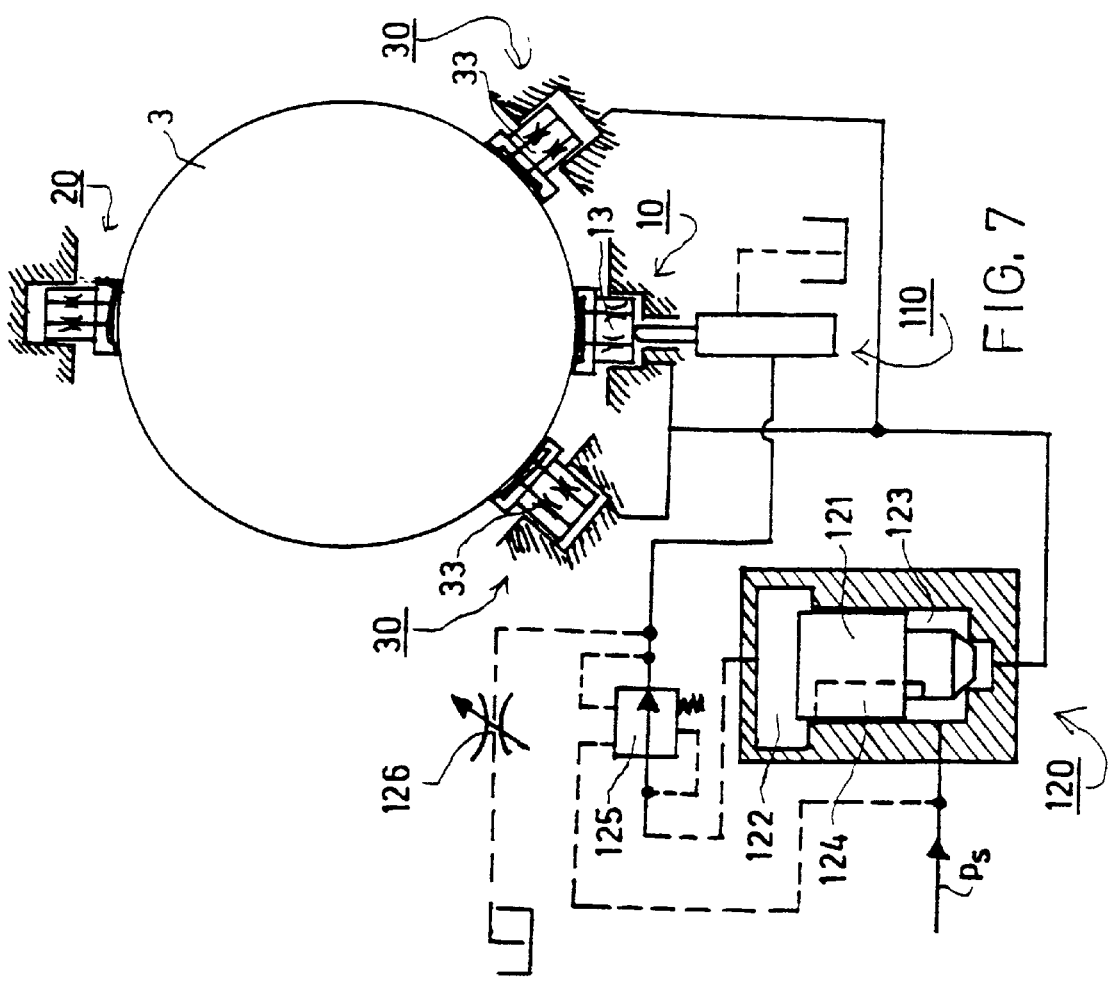

BEARING CONTROL SYSTEM FOR A ROLL WITH HYDROSTATIC BEARINGS

FIELD OF THE INVENTION

The invention concerns a bearing control system for a roll with hydrostatic bearings in a paper machine or paper finishing device, which roll has a principal loading direction in which it is loaded primarily and which roll is mounted from its axle on a bearing block or on an equivalent frame member by means of a number of hydraulically loaded hydrostatic bearing elements, of which elements at least one bearing element, a so-called principal bearing element or an equivalent loading bearing element, acts in the principal loading direction and one bearing element, a so-called backup bearing element or an equivalent support bearing element, acts in the direction opposite to the principal loading direction, and which bearing elements are provided with bearing shoes positioned around the neck of the roll axle in order to support said axle and, thus, the roll revolvingly in relation to the frame member, such as a bearing block.

BACKGROUND OF THE INVENTION

In the prior art, the rolls in paper machines and paper finishing devices, with the exception of rolls in which the roll mantle can move in relation to the roll axle, have, as a rule, been journalled on the frame constructions of the machine by means of roller bearings. In particular, in the case of rolls that form a nip, such as calender rolls, soft calender rolls and size press rolls, such mounting by means of roller bearings has caused certain problems, whose solution has required particular arrangements. In nip rolls it is necessary to measure the nip load, but in some cases the measurement has been problematic. For example, in a soft calender it is necessary to run in a range of linear load in which the bearing load is close to zero, which is highly problematic from the point of view of a roller bearing, because in a zero load situation the rolling members in the roller bearing are capable of gliding to a considerable extent in relation to the bearing races, in stead of rolling, which results in quite rapid damaging of the bearing. Also, for example, in size presses the running takes place with quite low linear loads so that low loads are applied to the rolls. In heatable rolls, such as, for example, calender rolls and equivalent, the problem is mainly related to successful lubrication of the bearing, and not so much to control of the bearing play. Also out of this reason, in the case of roller bearings, it has been necessary to employ special arrangements. Roller bearings also involve a problem in respect of the limitation of speed. Such limitations in respect of the speed of rotation involve, for example, the generation of heat in the bearing and, in this connection, the possibility of cooling the bearing. Among other things, out of this reason, roller bearings impose a certain limit on the speed of rotation, which limit the manufacturer of the bearing does not permit to be exceeded. As was already stated earlier, the accuracy of rotation of the bearing is limited, among other things, because of inaccuracies in the roller members and bearing races. Even if, in a conventional roll, all the components were manufactured as precisely as possible, the errors arising from inaccuracies are summed up in an assembled roll.

Owing to the problems related to the mounting of rolls by means of roller bearings, in recent years, various glide bearing solutions have been developed for journalling of rolls to an ever increasing extent. The construction and the embodiment of a glide bearing in themselves are quite simple, but, in particular in the case of nip rolls, the problems often arise from the way in which a glide bearing can be controlled in view of controlling the loads applied to the bearings and the radial shifting of the roll. Thus, the problems are mainly concentrated on the control systems of a glide bearing.

With respect to the prior art, reference is made, for example, to the EP Patent No. 158,051, which concerns journalling of a washing drum. In this solution, tie journalling has been accomplished as a mounting by means of glide bearings by means of hydrostatic bearing segments. A mode of journalling in accordance with said paper can, however, not be employed, for example, in calender rolls that are in nip contact, because the mode of journalling of said EP publication does not involve any possibility of radial movement in the bearing itself. Nor can the loading of the bearing be varied in any way, and separate spring elements are required in order to attenuate oscillations. With respect to the prior art, reference is made further to the FI Patent Application No. 942756, in which a bearing for a heated roll is described. Also this mode of journalling involves the drawback that there is no radial possibility of shifting, because at least one hydrostatic bearing segment in the glide bearing solution is fully stationary and fixed in the radial direction in relation to the frame construction, and, thus, a roll journalled by means of said bearing cannot be displaced, for example, in the direction of the nip plane.

OBJECTS AND SUMMARY OF THE INVENTION

The object and the goal of the present invention is to provide a control system of a fully novel type for a roll that has been provided with hydrostatic bearings in a novel way, by means of which system drawbacks related to the prior-art solutions are avoided and by whose means, additionally, a considerable improvement is achieved over the prior-art solutions. In view of achieving this, the control system in accordance with the invention is mainly characterized in that the control system has been arranged to feed the pressures of the hydraulic pressure medium passing to the hydrostatic bearing elements so that the bearing shoes of the bearing elements are positioned freely around the neck of the axle.

By means of the invention, significant advantages are achieved over the prior-art solutions, and of these advantages, among other things, the following should be stated. Firstly, the bearings are, in the principal loading direction, in particular in the direction of a nip plane, not directly fixed to the frame, but the bearings can be loaded hydraulically by means of a piston-cylinder type device towards the axle or towards the bearing neck of the roll, respectively. By means of the control system in accordance with the invention, this permits shifting and displacing of the roll in said principal loading direction. Correspondingly, it permits seeking of the roll into the correct position and location and keeping of the roll in its place in relation to the bearing housing. Further, in the case of nip rolls, the invention permits precise regulation of the nip load and measurement of the nip load without special arrangements. With the system in accordance with the invention, the hydrostatic bearing shoes included in the bearing system can be fully freely positioned around the neck of the roll axle or around a corresponding bearing neck, in which case, for example, an increased diameter of the axle arising from heating of the axle does not cause any problem whatsoever, as do not an inclination or any other errors of position arising from bending of the axle. The journalling and the system for its control can be used purposefully, for example, for closing and opening a roll nip, because all the hydrostatic bearing shoes are mobile. The nip load can be computed directly from the fluid pressures of the bearing shoes, because said shoes produce the, loading of the roll nip and the fluid pressures are directly proportional to the linear loads in the nip. The bearing arrangement in itself receives and attenuates oscillations. Besides to nip rolls, the invention can also be applied to other rolls, such as various guide rolls or equivalent for web, wire or felt, in which the principal load applied to the roll bearings consists of the tension of the web, wire or felt running over the roll. The further advantages and characteristic features of the invention will come out from the following detailed description of the invention.

BRIEF DESCRIPTION OF THE DRAWINGS

In the following, the invention will be described by way of example with reference to the figures in the accompanying drawing.

FIG. 7 shows an alternative embodiment of the hydraulic control system of the journalling of a roll as shown in FIG. 1 provided with pre-control.

FIG. 7A shows a detail of FIG. 7.

DETAILED DESCRIPTION OF THE PREFERRED EMBODIMENTS

Figure 1:
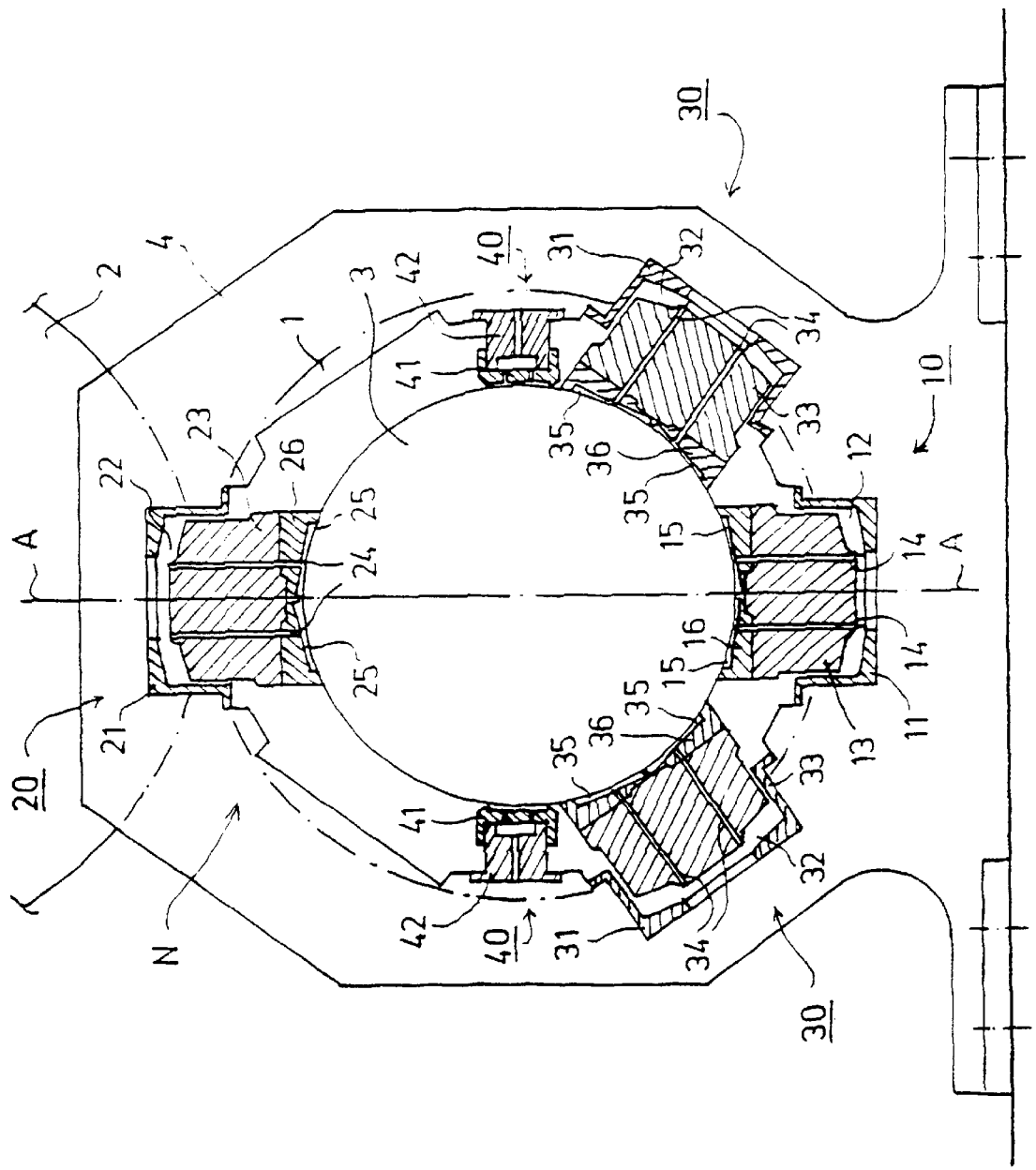
FIG. 1 is a schematic side view partly in section of an exemplifying embodiment of the glide bearing at one side of a roll journalled in accordance with the invention.

FIG. 1 in the drawing is a fully schematic illustration of a hydrostatic bearing intended for supporting a roll which forms a nip with a backup roll. The roll itself is illustrated by dashed-dotted lines and denoted with the reference numeral 1, and the roll axle is denoted with the reference numeral 3. The reference numeral 2 represents the backup roll, which forms a nip N with the roll 1, which nip is, for example, a calendering nip. The nip plane is denoted with the reference A—A.

The hydrostatic bearing shown in FIG. 1 consists of bearing elements 10,20,30,40, which are mounted on a bearing block 4 and which rest against the roll axle 3. The bearing arrangement comprises a main bearing 10,30, which acts in the principal loading direction, i.e. in the direction of the nip plane A—A, and which is loaded towards the nip N, a backup bearing 20 acting in the opposite direction, and side bearings 40 acting in opposite directions in the direction transverse to the nip plane A—A. In the illustration in FIG. 1, the main bearing has been divided into three parts so that it includes a first bearing element 10, which acts in the nip plane, and additionally second bearing elements 30, which have been arranged at an angle in relation to the nip plane and which are placed symmetrically. The main bearing that has been divided into three parts in the way illustrated in FIG. 1 is, however, just an exemplifying illustration of the construction of the bearing, which can also he accomplished in different ways. In respect of their construction, the first bearing element 10 and the second bearing elements 30 are similar to one another so that they comprise a cylinder 11,31 mounted on the bearing block 4, in which cylinder a loading piston 13,33 has been fitted displaceably. Below the loading piston 13,33, a pressure space 12,32 is formed in the cylinder 11,31, and the loading piston 13,33 can be loaded towards the axle 3 so that pressure medium is passed into said pressure space. To the end of the loading piston 13,33 facing towards the axle 3, a bearing shoe 16,36 is fixed, onto which lubricant pockets 15,35 opening towards the axle 3 have been formed. Into the loading piston 13,33, through capillary bores 14,34 have been formed, which, thus, connect the pressure space 12,32 in the cylinder with the lubricant pockets 15,35 on the bearing shoe. Thus, through the capillary bores 14,34 the pressure medium has access into the lubricant pockets 15,35 so that a fluid film is formed between the bearing shoe 16,36 and the axle 3, the bearing shoe 16,36 resting against the axle 3 by the intermediate of said fluid film.

The basic construction of the backup bearing 20 is similar to the construction of the bearing elements 10,30 of the main bearing so that the backup bearing element 20 consists of a cylinder 21 mounted on the bearing block 4 and of a loading piston 23 fitted displaceably in the cylinder. The loading piston 23 is further provided with a bearing shoe 26, onto which lubricant pockets 25 have been formed. Into the bearing shoe 26 capillary bores 24 have been formed, along which the fluid can flow from the pressure space 22 placed below the loading piston 23 in the cylinder into the lubricant pockets 25 to form a fluid film between the bearing shoe 26 and the neck of the axle 3. As is shown in FIG. 1, the backup bearing element 20 is installed in the nip plane A—A so that its direction of effect is parallel to the nip plane but of a direction opposite to the direction of effect of the main bearing.

In FIG. 1 it is shown further that the axle 3 is supported by means of bearings acting in the direction transverse to the nip plane A—A, i.e. by means of side bearings 40. In the illustration in FIG. 1, the side bearings 40 consist of a frame piece 42 mounted on the bearing block 4 and of a bearing shoe 41 fitted on support of the frame piece. By means of pressure fluid, the bearing shoes 41 are loaded against the roll axle 3. The function proper of the side bearings 40 is just to keep the axle 3 in its correct position and to attenuate oscillations in the transverse direction.

In the arrangement shown in FIG. 1, the loading of the roll nip N is produced by means of the bearing elements 10,30 of the main bearing. This is why the nip load can be computed directly from the fluid pressures of the bearing elements 10,30. Thus, precise regulation of the nip load can be accomplished by means of quite simple operations in the arrangement in accordance with the invention. As is shown in FIG. 1, the main bearing has been divided into three separate bearing elements 10,30, for which reason, if necessary, quite high loading forces can be produced by means of the bearing. In present-day soft calenders, in many cases, it is necessary to reach such a situation in the nip loading as corresponds to a zero load on the bearing in respect of the journalling. With conventional and traditional bearing solutions, this is quite difficult to accomplish. However, in the present invention, a zero load situation does not constitute any problem, for regulation of the loading to a zero load situation can be accomplished and achieved readily by means of the main bearing 10,30 and by means of the backup bearing element 20. As was already stated earlier, in the principal loading direction, i.e. in the direction of the nip plane A—A, the bearing elements 10,20,30 have not been fixed stationarily in relation to the bearing block 4, but each of the bearing elements is mobile. Owing to this, oscillations can be attenuated efficiently. Further, owing to this characteristic feature and in particular as the allowances for movements of the bearing elements are measured sufficiently large, opening and closing of the nip N can be taken care of by means of the bearing elements. For example, in consideration of a soft calender, in such a case, the bearing element can also be employed for instantaneous opening of the nip.

Figure 8:
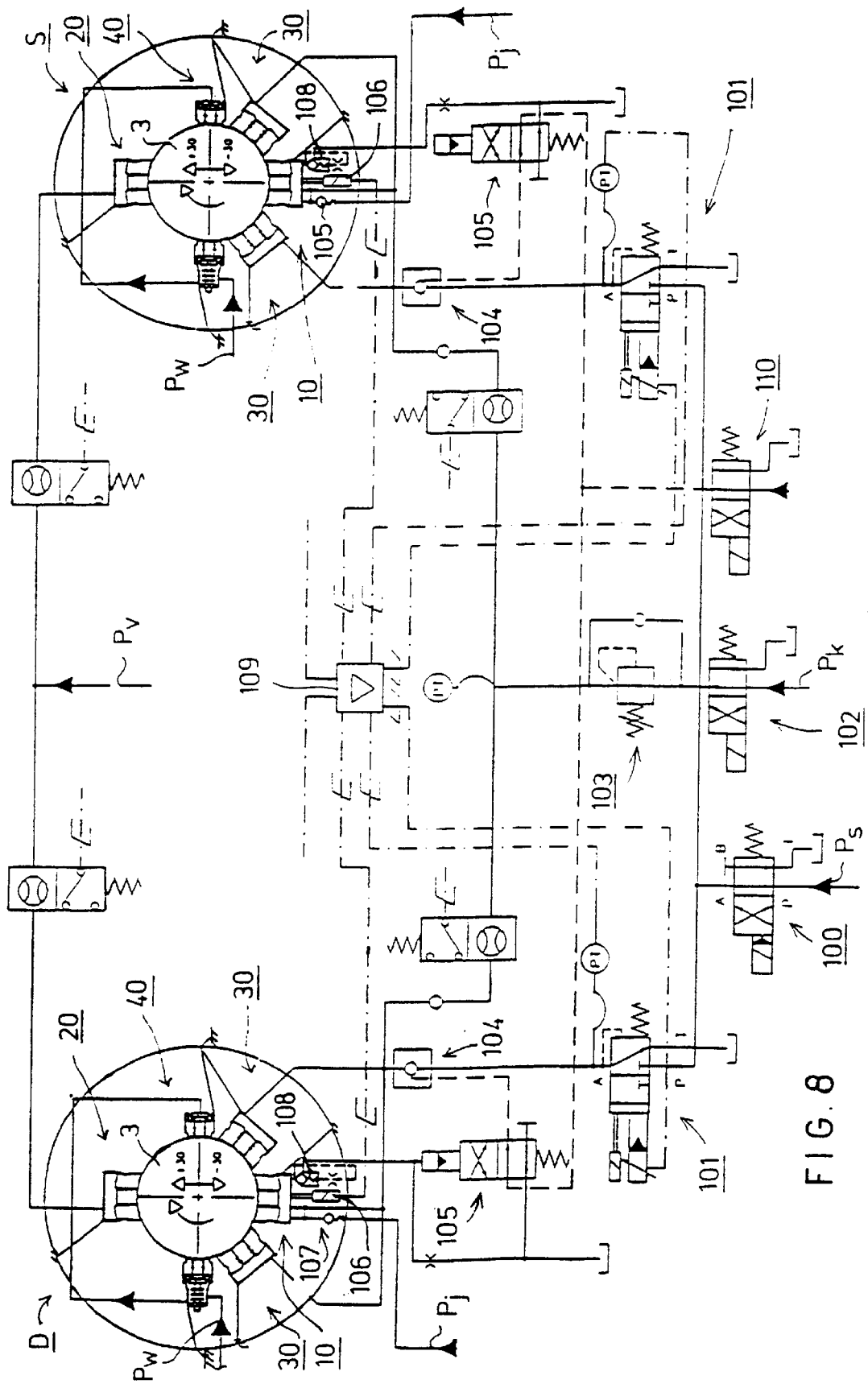
FIG. 8 is a schematic illustration of the principle of operation of an electrohydraulic control system as applied to the journalling as shown in FIG. 1.

The system of control of the bearing system of a roll journalled in the way as illustrated in FIG. 1 can be accomplished in accordance with the invention either as a mechano-hydraulic or electro-hydraulic solution. Mechano-hydraulic systems are illustrated in FIGS. 2 to 7, and they are mainly based on determination of the positions of the bearing shoes 16,36 of the main bearings 10,30 by means of a hydraulic element. A hydraulic monitoring system attempts to run the controlled bearing element into a predetermined position and to keep this position invariable irrespective of variations of loading. An electro-hydraulic control system, which is illustrated schematically in FIG. 8, is based on electric measurement of the position of the middle bearing element 10 of the main bearing 10,30 of the bearing system and on regulation of the loading pressure taking place based on the measurement data.

Figure 2:
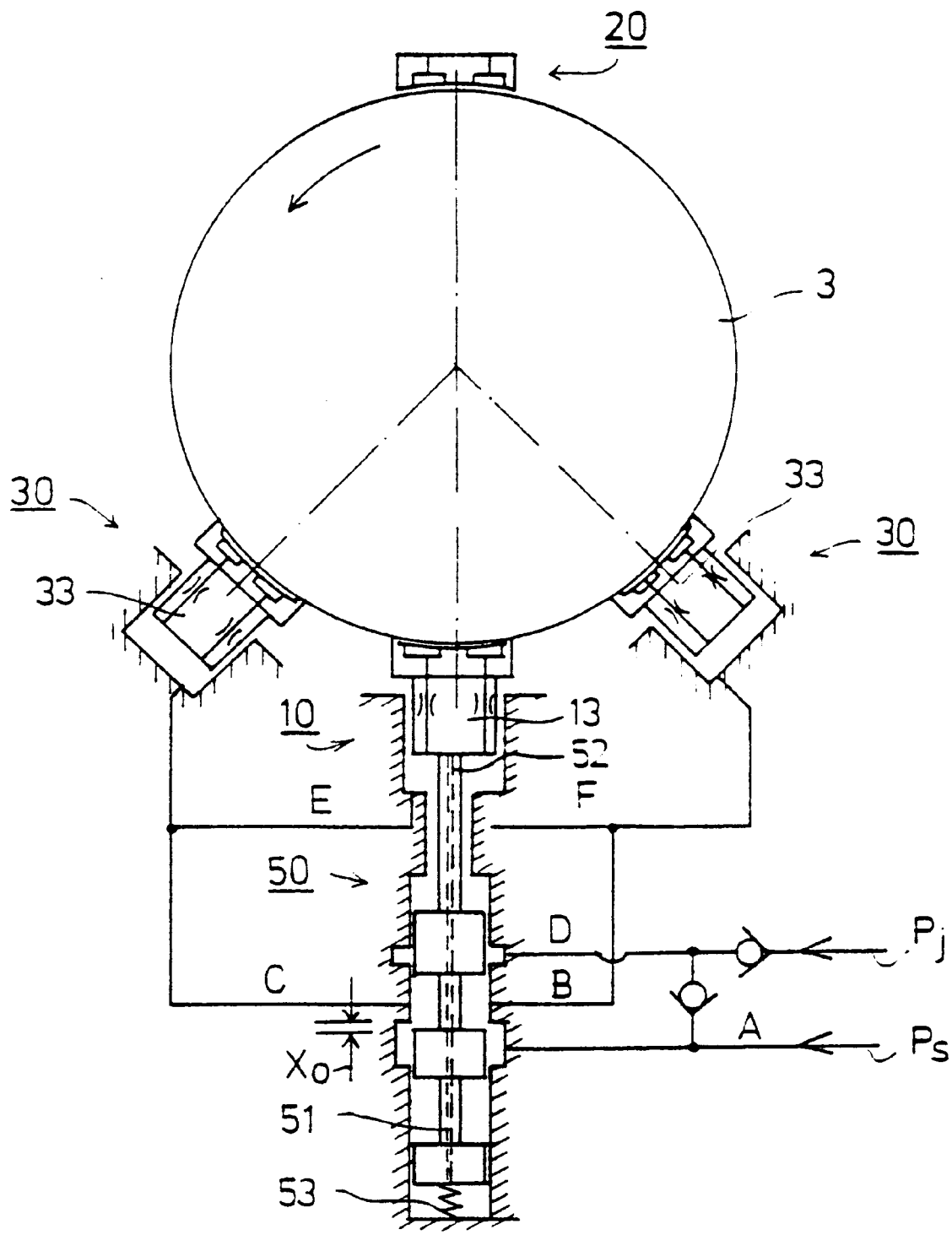
FIG. 2 is a schematic illustration of one embodiment of the hydraulic control system of the journalling as shown in FIG. 1.

FIG. 2 is a schematic illustration of a part of the hydraulic control system of the journalling, wherein the control of the bearing system is accomplished by means of a directly controlled valve 50. The system illustrated in FIG. 2 operates as follows. When the main bearing elements 10,30 are in the lower position, a movement of the main bearing elements 10,30 and, thus, of the roll axle 3 upwards is produced so that first the feed pressure $p_s$ is switched on into the line A. When the main bearing elements 10,30 are in their lower positions, the valve 50 spindle 51 has been pressed into its lower position against the force of the spring 53, because the pin 52 that has been formed on the spindle rests against the loading piston 13 of the middle main bearing element 10. In such a case, the pressure fluid can flow out of the line A into the lines B and C because the flow passage in the valve 50 is open while the spindle 51 has been pressed down. Out of the pressure lines B and C the pressure fluid can flow further into the lines E and F and out of said lines further to below the loading pistons 13,33 of the main bearing elements 10,30, in which connection the axle 3 rises by the effect of the loading pistons 13,33. The movement of the axle 3 stops when the flow is throttled in the valve 50 after the valve spindle 51 has moved to the position corresponding to the loading. In this connection, the spindle 51 has moved into a position in which the valve has been opened by the distance $x_0$, as is shown in FIG. 2. In the backup bearing element 20 an invariable pressure is effective all the time.

When the roll is in a loaded state and when the loading of the roll increases to such an extent that the axle 3 is pressed downwards and shifts the loading pistons 13,33 downwards along with it, the valve 50 is opened to a greater extent, in which case the pressure fluid can act below the loading pistons 13,33 with a higher pressure. Thus, opening of the valve 50 compensates for an increase in the load. When the roll nip is supposed to be opened, for example, in a situation of instantaneous opening, the feed pressure $p_s$ is eliminated from the pressure line A. Then the axle 3 and the loading pistons 13,33 move down, and near the lower position of the valve 50 the valve spindle 51 closes the pressure lines B and C, in which connection the braking pressure $p_j$ effective in the pressure line D has access through the valve 50 to act below the loading pistons 13,33. The braking pressure $p_j$ is lower than the feed pressure $p_s$, and it has remained switched on all the time.

Thus, in the arrangement as shown in FIG. 2, the flow in the bearings and, thereby, the pressure are regulated based on the loading applied to the bearing shoes of the bearing elements 10,30. When the loading is increased, the position of the loading pistons 13,33 tends to be changed, in which connection the system compensates for the change by increasing the flow. By means of this principle, attempts are made to keep the thickness of the fluid film in the bearing invariable. A hydrostatic bearing in which the thickness of the fluid film remains invariable irrespective of the load has an infinite rigidity. This is a common property aimed at with hydrostatic bearings.

Figure 3:
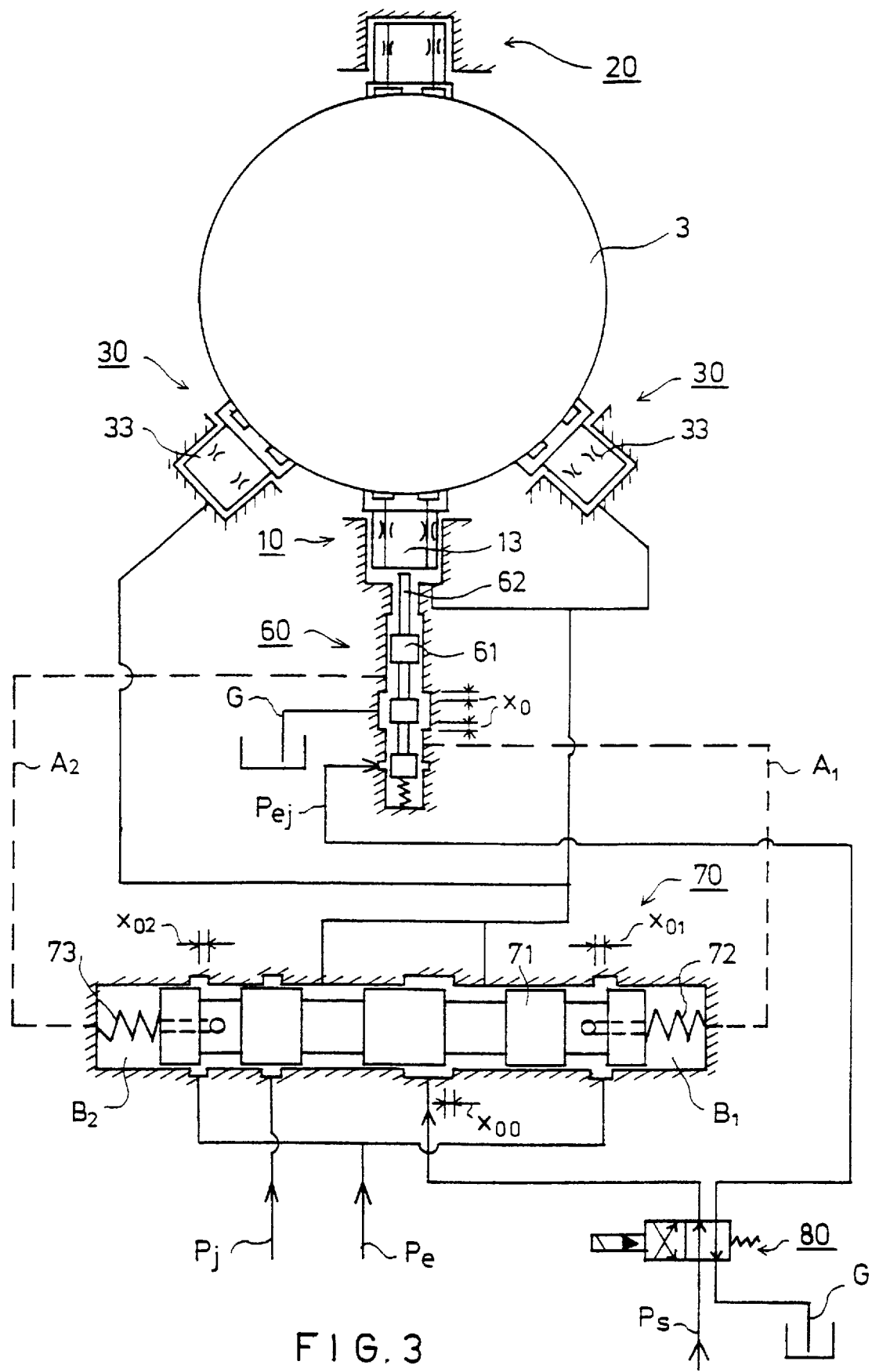
FIG. 3 is a schematic illustration of a second embodiment of the hydraulic control system of the journalling as shown in FIG. 1.

FIG. 3 illustrates a control system in which the control of the hydrostatic bearing has been accomplished by means of a pre-controlled valve. Compared with direct control, as advantages of pre-control can be considered, among other things, higher pressure/force amplification and improved rigidity. Further, the 0-point of the valve can be regulated better. The supply of pressure to three bearing, elements 10,30 by means of one main valve can be accomplished more readily than, for example, by means of a directly controlled valve as shown in FIG. 2.

FIG. 3 shows the control system while the roll is in the loaded state, in which connection the pre-control valve 60 is in the middle position shown in FIG. 3. The directional valve 80 is then also in the position shown in FIG. 3, in which connection the feed pressure $p_s$ passes through said directional valve 80 to the main valve 70 and from it further through the opening $x_{00}$ to the main bearing elements 10,30. The pre-control pressure $p_e$ flows (through bores formed into the spindle 71 of the main valve 70) into the spring chambers B1 and B2 placed at each end of the main valve and from there further along the lines A1 and A2 to the pre-control valve 60 and, when the spindle 61 of the pre-control valve is in the middle position shown in the figure, through the flow openings $x_0$ directly into the tank duct G. The pressures in the spring chambers B1 and B2 are equally high, and the springs 72,73 centre the spindle 71 in the position shown in FIG. 3. Thus, in the situation shown in the figure, the lubricant flow required by the desired thickness of the fluid film to be formed on the bearing shoes of the bearing elements 10,30 flows with the designed difference in pressure through the flow opening $x_{00}$ in the main valve 70 to the main bearing elements 10,30.

When the load applied to the roll is increased, the force is transferred through the roll axle 3 and through the middle main bearing element 13 to the spindle 61 of the pre-control valve 60 by the intermediate of the pin 62, in which connection the spindle 61 moves downwards as the flow increases from the line A2 and, similarly, decreases from the line A1 into the tank duct G. In such a case, the pressure in the spring chamber B2 is lowered and in the chamber B1 is increased, in which case the force applied to the spindle 71 of the main valve 70 and directed to the left in FIG. 3 increases. Then, the spindle 71 of the main valve 70 starts moving to the left in the figure, in which connection the flow opening $x_{02}$ that controls the feed of the pre-control pressure $p_e$ is opened to a greater extent and, similarly, the flow opening $x_{01}$ is closed to a greater extent. The spindle 71 of the main valve 70 moves to the left in FIG. 3 to such an extent that a new equilibrium of forces is reached. The opening of the flow opening $x_{02}$ corresponds to the increased opening of the spindle 61 of the pre-control valve 60. At the same time, the flow opening $x_{00}$ at the spindle 71 of the main valve 70 feeds more fluid to the bearing elements 10,30, which means that the main valve 70 has compensated for the increase in the loading of the roll.

In the opening of the roll nip, first, the directional valve 80 is switched into a different position, in which case the pressure present below the loading pistons 13.33 in the main bearing elements 10,30 is connected to the tank line G and, similarly, the feed pressure $p_s$ is switched to constitute a pre-control pressure $P_{ej}$ for braking. Then, the axle 3 and the loading pistons 13,33 move to their lower positions, and near said lower position the pre-control valve 60 opens a connection between the pre-control pressure $p_{ej}$ for braking and, in the figure, the right-side spring chamber B1 of the main valve 70 through the flow line A1. In such a case, the spindle 71 of the main valve 70 moves directly in FIG. 3 to its extreme position to the left and closes the connection with the tank line G from the ducts passing to below the loading pistons 13,33. When the spindle 71 of the main valve moves in the way described above, almost at the same time a connection is opened from the line of braking pressure $p_j$ to the lines passing to below the loading pistons 13,33. In such a case, the braking pressure $p_j$ is connected to below the loading pistons 13,33, which attenuates the lowering of the axle 3 and of the loading pistons 13,33 and, at the same time, takes care of the supply of lubrication fluid to the bearings. When the roll is being raised again, at the beginning of the raising the directional valve 80 is again switched to the position shown in FIG. 3, in which connection the spindle 71 of the main valve 70 moves somewhat to the right in FIG. 3, and the supply of pressure fluid $p_s$ is started again through the flow opening $x_{00}$ to below the loading pistons 13,33.

Figure 4:
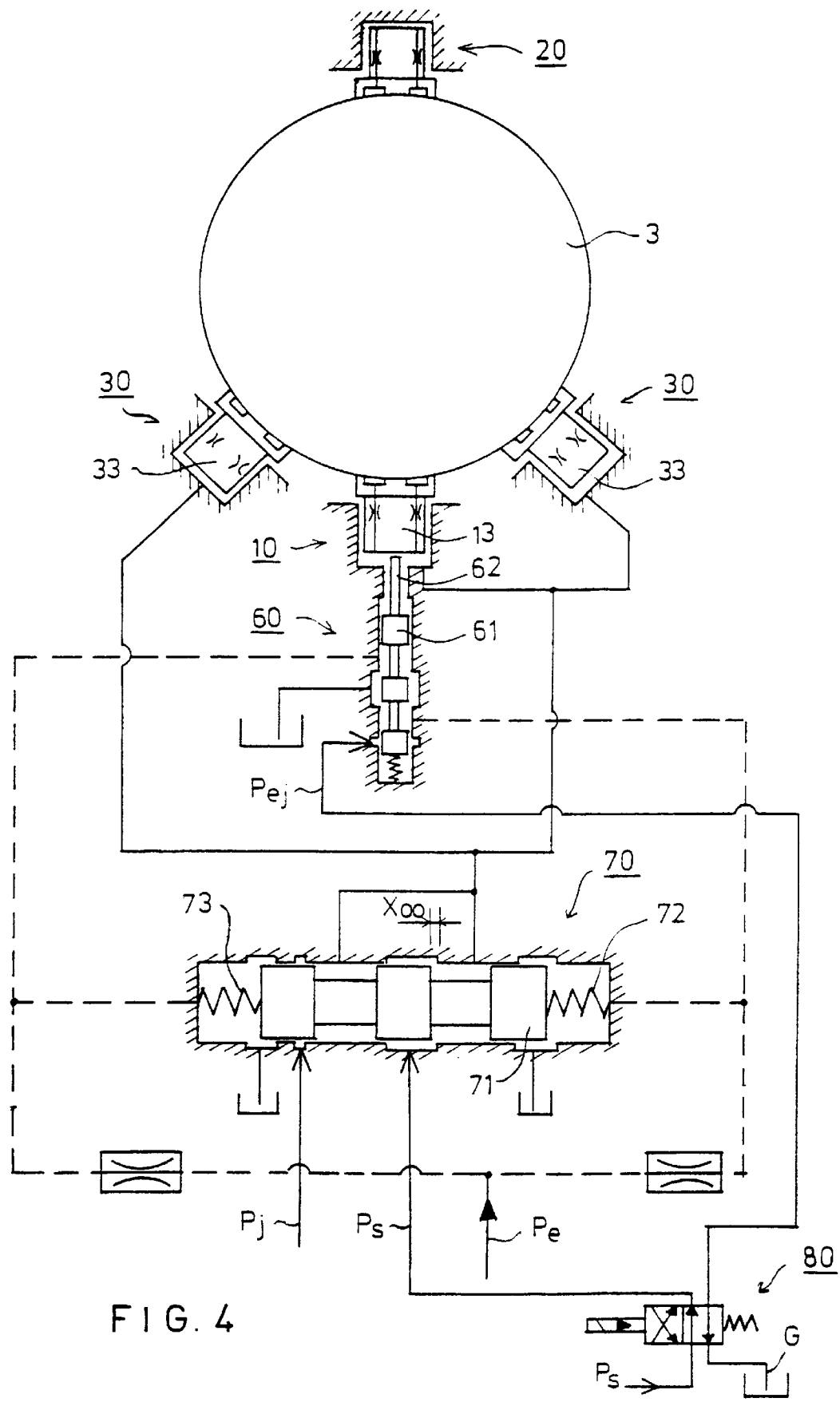
FIG. 4 is a schematic illustration of a further embodiment of the hydraulic control system of the journalling as shown in FIG. 1.

The bearing control illustrated in FIG. 4, accomplished by means of a pre-controlled valve, is quite far similar to what was described in relation to FIG. 3. FIG. 4 differs from FIG. 3 exclusively in the respect that the mode of feed of the pre-control pressure is different in the embodiment now being discussed. The solution shown in FIG. 4 is illustrated here merely as one alternative embodiment, for the embodiment shown in FIG. 3 can be considered to be better than the solution now being discussed, in particular because the rigidity obtainable by means of the arrangement shown in FIG. 4 is at least to some extent inferior to that obtainable by means of the solution illustrated in FIG. 3.

Further, still with reference to FIGS. 3 and 4 and in consideration of the regulation of the positions of the loading pistons 13,33, it can be stated that the pre-controlled main valve 70 permits fine adjustment of the loading pistons 13,33. When an extra leakage is arranged in the pre-control line A1, the condition of equilibrium of the spindle 71 of the main valve 70 can be carried into effect with different positions of the pre-control valve 60.

Figure 5:
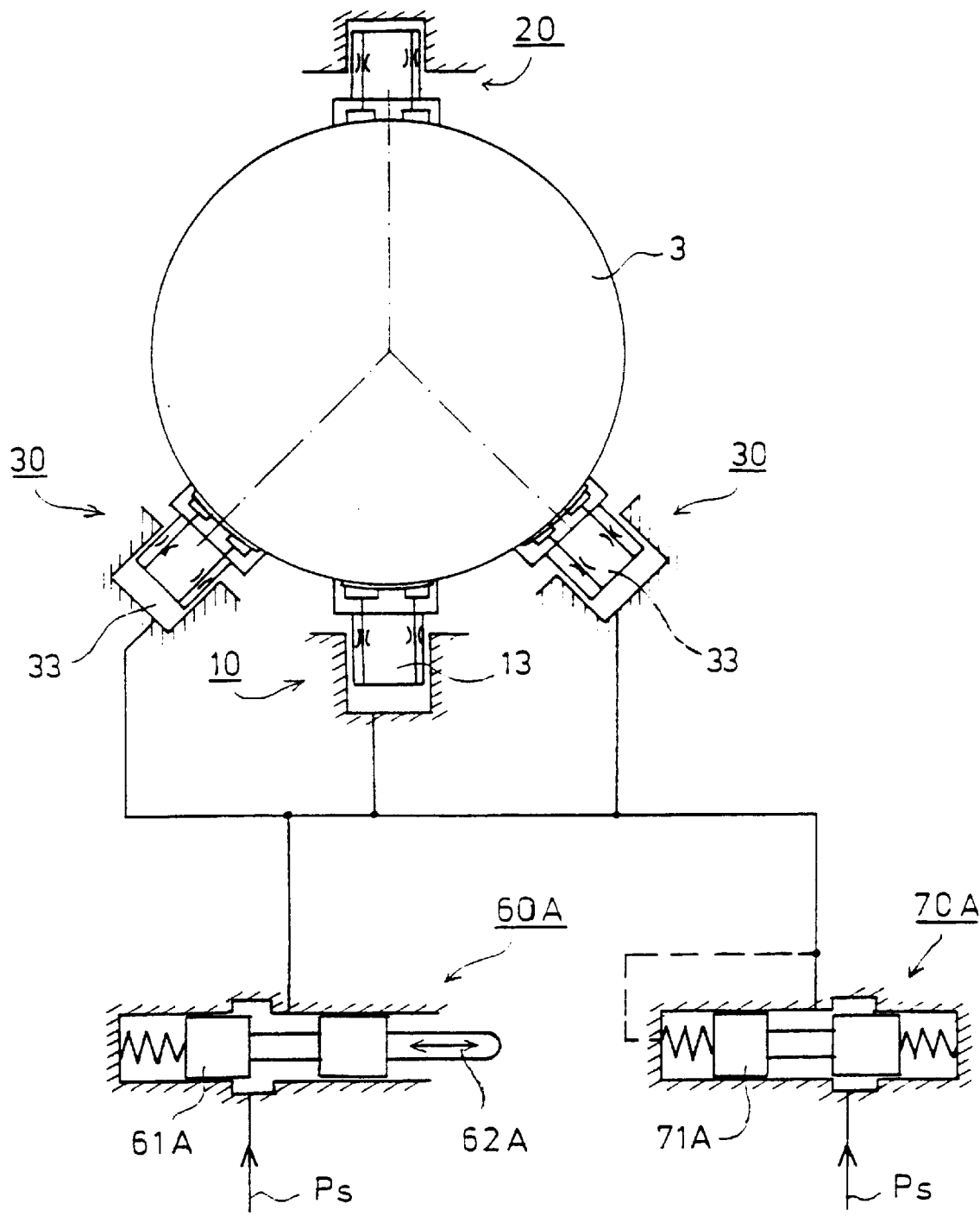
FIG. 5 is a schematic illustration of an alternative embodiment of the hydraulic control system of the journalling as shown in FIG. 1.

FIG. 5 is a fully schematic illustration of principle of a further embodiment of the invention. In the solution of FIG. 5, the valve 60A is a main control valve that feeds the bearing elements 10,30 and through which, thus, the feed pressure $p_s$ is passed to below the loading pistons 13,33 of the bearing elements. The control for the valve 60A can be given either manually or electrically by means of a control member 62A connected with the valve spindle 61A. The system of FIG. 5 further includes an auxiliary valve 70A, which reacts to changes in the load so that, when the pressure at the bearing elements 10,30 becomes higher, said auxiliary valve 70A increases the flow of pressure fluid while attempting to maintain the thickness of the fluid film invariable. As was already stated above, FIG. 5 is just an illustration of principle. Besides the components shown in FIG. 5, the system requires an auxiliary valve that takes care of braking. The solution of FIG. 5 is particularly well suitable for bearing elements 10,30 whose movements are confined to very small dimensions.

Figure 6:
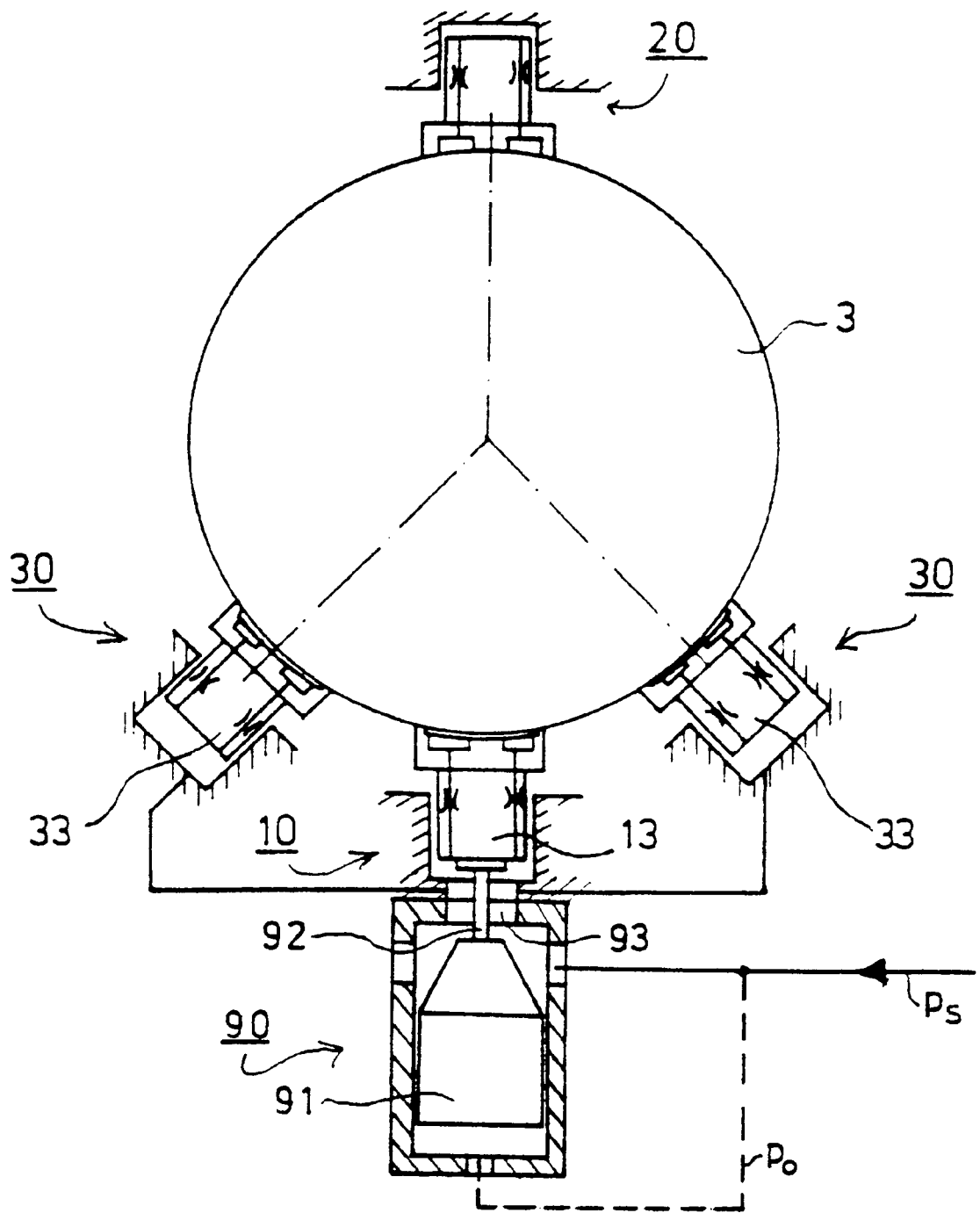
FIG. 6 shows a further variation of the hydraulic control system of the journalling in accordance with the invention, as shown in FIG. 1, of a roll provided with hydrostatic bearings.

FIG. 6 is a fully schematic illustration of principle of one variation of the solution in accordance with the invention. In the system shown in FIG. 6, a pin 92 is connected with the loading piston 13 of the middle main bearing element 10, which pin controls the valve 90 placed below said bearing element 10. When the loading piston 13 is in its lowest position, the pin 92 has pressed the valve 90 spindle 91 to its lowest position, in which case the valve 90 is fully open. When the feed pressure $p_s$ is switched on to the pressure line, the fluid flow is passed through the valve 90 through the valve opening 93 to below the loading pistons 13,33 of the main bearing elements 10,30, in which connection the axle 3 moves upwards. An invariable pressure is effective in the backup bearing element 20.

From the pressure line of feed pressure $p_s$, a control pressure branch $p_o$ has been taken to below the valve spindle 91 so that, when the axle 3 and the middle loading piston 13 move upwards, the valve spindle 91 also rises upwards. By the intermediate of the middle loading piston 13 and the pin 92, the upward movement of the valve 90 spindle 91 reduces the opening of the valve 90 and throttles the flow. The flow opening 93 becomes smaller until an equilibrium has been reached between the pressure forces and the mass forces (weight of the axle 3 and possible outside load). An increase in the load interferes with the equilibrium that has been reached and opens the valve 90 spindle 91, in which connection the flow of fluid to below the loading pistons 13,33 is increased and the pressure becomes higher and compensates for some of the increased load. However, a slight deviation of regulation, i.e. an increased opening of the valve, arises, which is not compensated by the system. The operation of compensation is based on the formation of said deviation of regulation.

FIGS. 7 and 7A illustrate a further alternative embodiment of a bearing control system provided with pre-control. In this embodiment, the control of the journalling has been accomplished by means of a commercially available regulation valve 120, as whose "spindle" a so-called Rego™ cartridge 121 is used, and by means of a pre-control valve 110, which is illustrated in more detail in FIG. 7A. The position of the loading piston 13 of the middle main bearing element 10 is measured by the spindle of the pre-control valve 110, whose pin 113 follows the movement of the loading piston 13 and moves the spindle 112 of the pre-control valve 110 accordingly. The regulation valve 120, i.e. the so-called Rego™ valve 120, operates as the main valve, and it is controlled by the pre-control valve 110. Into the frame 111 of the pre-control valve 110, an oblong opening 114 parallel to the movement of the spindle 112 has been formed, which opening regulates the pre-control flow based on the position of the loading piston 13. Below the spindle 112 of the pre-control valve, there is a spring 116, which forces the spindle 112 to follow the movement of the loading piston 13.

When the loading piston 13 is in its lower position, the opening 114 that has been machined into the frame 111 of the pre-control valve 110 is fully open, and the pressure effective in the chamber 122 above the cartridge 121 of the Rego™ valve 120 is at its minimum value. When the feed pressure $p_s$ is switched on to the Rego™ valve 120, the pressure starts acting at the bottom side of the cartridge or, more accurately, in the chamber 123 placed in the lower part, in which connection the pressure raises the cartridge 121 to an upper position and opens the valve 120 completely, in which connection the feed pressure $p_s$ has access to below the loading pistons 13,33 of the main bearing elements 10,30. As is well known, in the side of the Rego™ cartridge 121, there is an oblong groove 124, and when the valve 120 is opened, i.e. the cartridge 121 rises upwards, fluid has access through said groove 124 and flows from the lower chamber 123 into the upper chamber 122 and from it further through the opening 114 into the pre-control valve 110 and through it through the tank bores 115 into the tank.

When the axle 3 and, thus, the spindle of the pre-control valve 110 rise, the area of the opening 114 machined into the frame 111 of the pre-control valve 110 starts becoming smaller, in which connection the pressure above the Rego™ cartridge becomes higher and the Rego™ valve 120 starts closing. When the cartridge 121 is closed, the flow area formed by the groove 124 machined into said cartridge becomes smaller, in which connection the flow in the pre-control circuit passing from the Rego™ valve 120 to the pre-control valve 110 is also reduced. The spindle 121 of the Rego™ valve 120, which operates as the main valve, is closed to such an extent that a state of equilibrium is reached between the flow passing through the groove 124 into the pre-control circuit and the flow discharged from the pre-control circuit through the pre-control valve 110.

In the pre-control circuit, as is shown in FIG. 7, between the Rego™ valve and the pre-control valve 110, a pressure difference valve 125 has been installed, by means of which valve the pressure difference effective across the pre-control part is made invariable, in which connection the flow depends exclusively on the position of the spindle 112 of the pre-control valve 110 and not on the load pressure or on the feed pressure. By means of an adjustable throttle 126, which has been coupled in parallel with the pre-control valve 110, it is possible to regulate the position of the axle 3 precisely from outside.

Finally, FIG. 8 is a fully schematic illustration of the principle of operation of the electro-hydraulic control system in accordance with the invention. By means of the system illustrated in FIG. 8, the roll axle 3 journalled by means of hydrostatic bearing elements 10,20,30,40 can be controlled with a running mode based either on position regulation or on force regulation. In a case in which the backup roll of a roll provided with glide bearings is a variable-crown roll provided with a mobile mantle, the roll with glide bearings is controlled as position-regulated. In such a case, the position of the journalled axle 3 remains invariable irrespective of the load produced by the backup roll. In a case in which the backup roll is a fixed-mantle variable-crown roll, the axle 3 of the roll with glide bearings is controlled as force-regulated. The pressures in the bearing elements 10,30 are regulated in proportion to the outside load. The higher the linear load produced by the stationary backup roll, the higher is the bearing pressure that is controlled to the bearing elements 10,30. The guide value of the loading pressure is received from the main control system that carries out computing of the linear load.

In FIG. 8, the driving side of the roll is denoted with the reference D, and the tending side with the reference S. The position of the roll axle 3 in FIG. 8 in the vertical direction, i.e. in the principal loading direction, is measured indirectly by means of a detector that is connected to the loading piston of the main bearing elements and that measures the position of the bearing shoe of the bearing element indirectly. As the position detector, a contact-free magnetostrictive detector 106 is used. On the other hand, the loading force is measured by measuring the loading pressure. The position and pressure communications from the driving side D and from the tending side S are passed to a separate logic unit 109 which controls the bearing system and which communicates with the main control system. The separate logic takes care of the regulation of the position and the loading force of the journalled axle 3. The main control system gives the set values to the separate logic.

The feed pressure $p_s$ is fed to the bearing elements 10.30 by means of a directional valve, which operates as the main valve 100 of the control system and by whose means either the feed pressure or the tank pressure is passed to the driving-side D and tending-side S regulation valves 101 which control the bearing system. Also, a relief pressure $p_k$, which is used as a mechanical securing pressure, is passed to the loading pistons of the main bearing elements 10,30 by means of a separate directional valve 102. The magnitude of the relief pressure $p_k$ is regulated by means of a mechanical pressure reduction valve 103 placed after the directional valve 102. When the relief pressure $p_k$ is lower than the pressure that is regulated by means of the regulation valves 101, the relief pressure $p_k$ can act upon the loading pistons. In a situation of disturbance, the axle 3 is controlled onto the support of this mechanically regulated relief pressure $p_k$. The relief pressure $p_k$ can be eliminated by changing the position of the directional valve.

In the pressure duct passing to the bearing elements 10,30, after the regulation valves 101, there are check valves 104 that operate as lock valves. The operation of these lock valves 104 is controlled by means of a directional valve 110. The control pressure is passed to the lock valves 104 through hydraulically controlled directional valves 105. In a running situation, the lock valves 104 have no control pressure, and the fluid can flow exclusively from the regulation valve 100 to the loading elements 10,30 and not at all in the opposite direction. In a situation of instantaneous opening, the lock valves are controlled to the open position by means of the directional valves 105. At the same time, the regulation valves 101 switch on the connection of the regulated pressure to the tank line, in which case the journalled axle 3 moves rapidly to its lower position. On reaching the lower position, the pins provided at the bottom of the middle main bearing element 10 open the backup valves 107,108 placed below the loading piston and the cylinder. One backup valve 107 switches on the braking pressure $p_j$ to below the loading pistons 13, whereas the other backup valve switches on the pressure present below the loading piston to constitute a control pressure for the hydraulically controlled directional valves 105, which change their positions so that they eliminate the control pressure that opens the lock valves 104. in which connection the lock valves 104 are closed, and the fluid flow that has been switched on to the loading pistons and that produces the braking pressure cannot be discharged through the regulation valve into the tank line. The axle 3 remains revolving in the lower position on support of the braking pressure.

An invariable pressure $p_y$ which supports the axle 3 is passed to the backup bearing element 20. This pressure produces a flow through the bearing shoe of the backup bearing element 20. Said flow is monitored by means of flow connectors. If the loading force produced by the bearing shoes of the main bearing elements 10,30 becomes excessively high, the flow passing through the backup bearings element 20 is prevented, and the flow connectors report an overload situation.

The pressures of the side bearing elements 40 are controlled in a known way so that the axle 3 remains concentric in relation to the bearing housing in the lateral direction.

Figure 9:
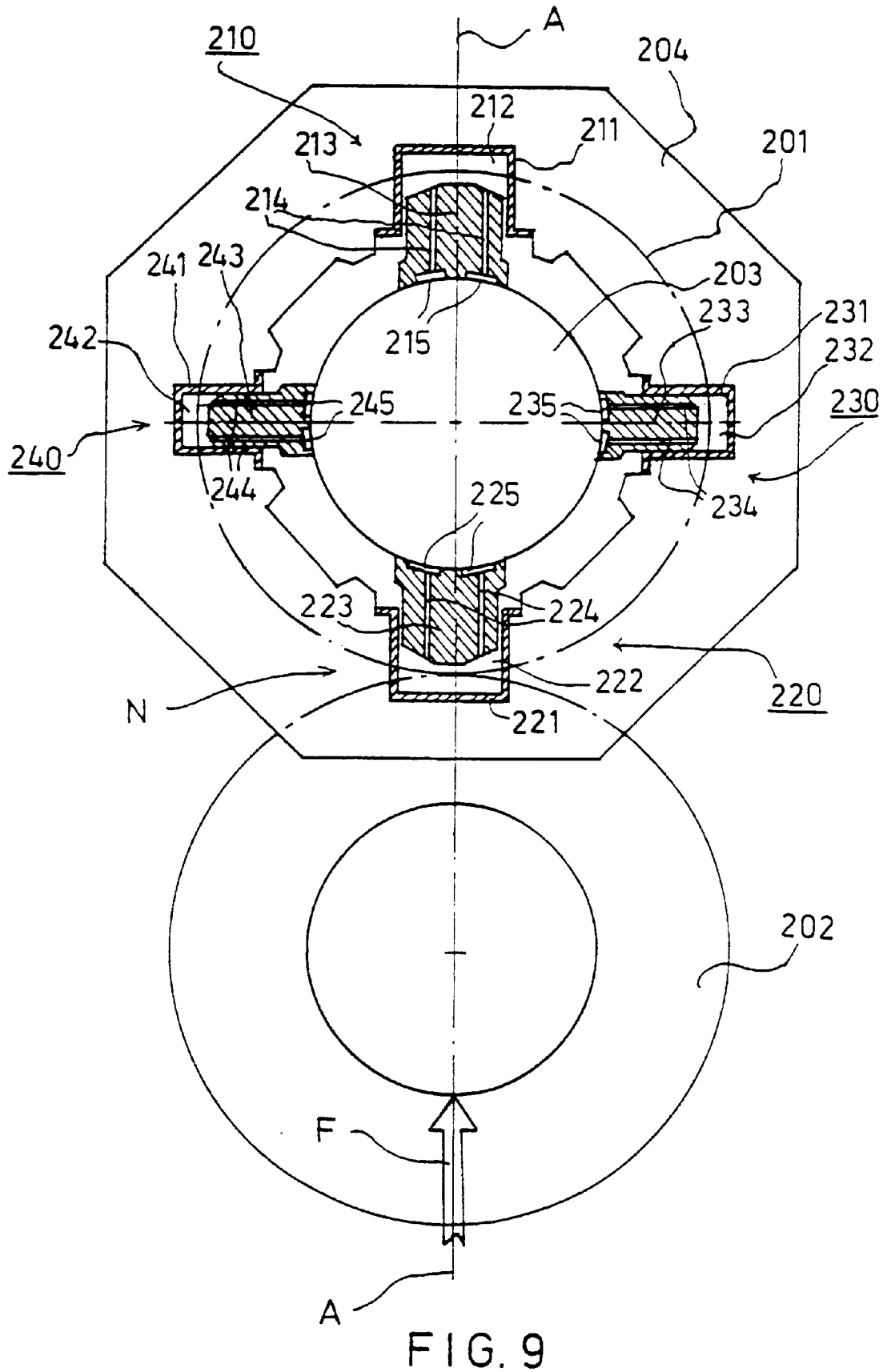
FIG. 9 is a fully schematic side view partly in section of an alternative exemplifying embodiment of the glide bearing at one side of a roll that forms a nip and that has been journalled in accordance with the invention.

FIG. 9 in the drawing is a fully schematic illustration corresponding to FIG. 1 of a hydrostatic bearing intended for supporting a roll in a roll which forms a nip with a backup roll. The roll itself is illustrated by dashed-dotted lines and denoted with the reference numeral 201, and, similarly, the roll axle is denoted with the reference numeral 203. The reference numeral 202 represents the backup roll, which forms a nip N with the roll 201, which nip is, for example, a size press nip, a calendering nip or equivalent. The nip plane is denoted with the reference A—A.

The hydrostatic bearing shown in FIG. 9 comprises bearing elements 210,220,230, 240, which are mounted in a bearing block 204 and which rest against the roll axle 203 in the illustration in FIG. 9. The journalling arrangement comprises a support-bearing element 220 and a loading-bearing element 210 acting in opposite directions in the principal loading direction, i.e. in the direction of the nip plane A—A, as well as side control bearing elements 230, 240 acting in opposite directions in the direction transverse to the nip plane A—A. In respect of their basic construction, the support-bearing element 220 and the loading-bearing element 210 are similar to one another so that they comprise cylinders 221,211 installed in the bearing block 204, in which cylinders the loading pistons of the support shoe 223 and of the loading shoe 213. respectively, have been fitted displaceably. In the cylinder 221,211, below said loading pistons, a pressure space 222,212 is formed, and the support shoe 223 and the loading shoe 213, respectively, can be loaded towards the axle 203 by passing a pressure medium into said pressure space. Onto the support shoe 223 and onto the loading shoe 213, at the end placed against the axle 203, lubricant pockets 225,215 have been formed, which open towards the axle 203. Into the support shoe 223 and into the loading shoe 213, respectively, through capillary bores 224, 214 have been formed, which connect the pressure spaces 222,212 in the cylinders with the lubricant pockets 225,215. Thus, through the capillary bores 224,214, the pressure medium has access to the lubricant pockets 225,215 so that a fluid film is formed between the support shoe 223 and loading shoe 213 and the axle 203, by means of which film said shoes rest against the axle 203.

In FIG. 9, it is shown further that the axle 203 is supported by means of side control bearing elements 230,240 acting in the direction transverse to the nip plane A—A. In the illustration of FIG. 9, the side control bearing elements 230,240 consist of cylinders 231,241 installed in the bearing block 204 and of side control shoes 233,243 fitted in said cylinders displaceably. In the cylinder 231,241, below the piston part of the side control shoe 233,243, a pressure space 232,242 is formed, and the side control shoes are loaded against the roll axle 203 by passing pressure fluid into said pressure space. Further, onto the side control shoes 233,243, lubricant pockets 235,245 opening towards the axle 203 have been formed, which pockets communicate with the pressure spaces 232,242 in the cylinders through capillary bores 234,244 passing through the side control shoes so that, through said capillary bores, the pressure medium has access from the pressure spaces 232,242 into the lubricant pockets 235,245 so as to form a fluid film between the side control shoe 233,243 and the axle 203. By means of the side control shoes 233,243, the axle 203 is kept in its correct position in the direction transverse to the nip plane A—A, and oscillations are attenuated in said transverse direction.

Figure 10:
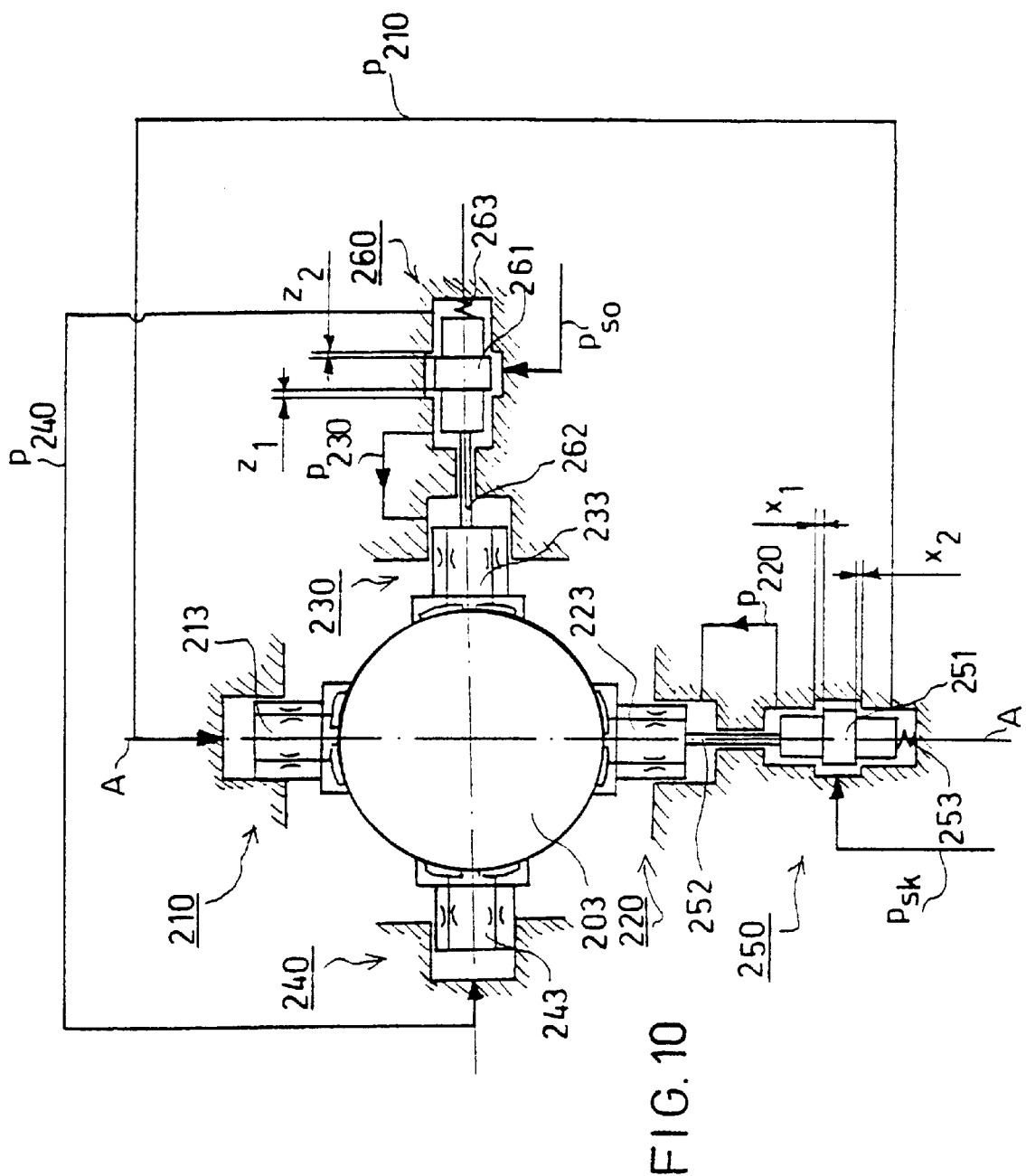
FIG. 10 is a schematic illustration of a preferred embodiment of a hydraulic control system of a bearing system as shown in FIG. 9.

FIG. 10 is a fully schematic illustration of a preferred exemplifying embodiment of a system of control of a glide-bearing as shown in FIG. 9 in accordance with the invention. In accordance with FIG. 10, both the bearing elements 210,220 acting in the direction of the nip plane A—A and the bearing elements 230.240 acting in the direction transverse to the nip plane are controlled by means of hydraulic valves 250,260. The first hydraulic valve 250, by whose means the support shoe 223 and the loading shoe 213, which act in the direction of the nip plane A—A, are controlled, comprises a slide 151, which is connected, as is shown in FIG. 10, for example, by the intermediate of a pin 252 or an equivalent member, with the support shoe 223 so that the movement of the slide 251 follows the movement of the support shoe 223. In order to make sure that the slide 251 really follows the movement of the support shoe 223, a spring 253 may be fitted below the slide 251, which spring keeps the pin 252 in contact with the support shoe 223. Ensuring of this movement can, of course, also be arranged in some other way. Thus, the feed pressure $p_{sk}$ for the support and loading of the roll 201 is fed into the first hydraulic valve 250, through which the control pressures are passed both to the support shoe 223 and to the loading shoe 213. In FIG. 10, the control pressure passing to the support shoe 223 is denoted with the reference $P_{220}$, and the control pressure passing to the loading shoe is denoted with the reference $P_{210}$, respectively.

Similarly, the second hydraulic valve 260, by whose means the lateral control shoes 233,243 are controlled, comprises a slide 261, which is connected with the first side control shoe by the intermediate of a pin 262 or an equivalent member so that the movement of the slide 261 complies with the movement of said first side control shoe 233. Also in the case of the second hydraulic valve 260, it is shown in FIG. 10 that, in order to secure the movement of the slide 261, a spring 263 has been fitted behind the slide. Thus, the feed pressure $p_{so}$ for the side control is passed into the second hydraulic valve 260, from which the control pressures are taken for each of the side control shoes 233,243. The pressure passing to the first side control shoe 233 is denoted in FIG. 10 with the reference $P_{230}$, and similarly the pressure passing to the second side control shoe 243 is denoted with the reference $P_{240}$.

As was already stated earlier, the function of the side control shoes 233,243 is to keep the roll 201 in its position in the direction transverse to the nip plane A—A. In the control system in accordance with the invention, shown in FIG. 10, this has been carried into effect so that the feed pressure $p_{so}$ for the side control is fed to the second hydraulic valve 260, from which, depending on the position of the slide 261 of the hydraulic valve, the pressures are passed to each of the side control shoes 233,243. In FIG. 10, the axle 203 of the roll and, thus, the slide 261 of the second hydraulic valve 260 are shown in the middle position, in which case the necessary flow openings $z_1,z_2$ remain at both sides of the slide 261, through which openings the pressures $p_{230},p_{240}$ have access to the side control shoes 233,243. If the roll axle 203 moves to the left from the position shown in FIG. 10, the first side control shoe 233 and the slide 261 of the hydraulic valve follow the movement of the axle. In such a case, the first flow opening $z_1$ is throttled and possibly closed completely, whereas the second flow opening $z_2$ is opened to a greater extent, as a result of which a higher pressure is passed to the second side control shoe 243, whereas the pressure passing to the first side control shoe 233 is reduced. On the other hand, as a result of this, the roll axle 203 moves to the right in FIG. 10, being pushed by the second side control shoe 243, in which case, similarly, the first flow opening $z_1$ is opened to a greater extent, and the second flow opening $z_2$ is throttled. When the axle 203 has reached its correct position, the flow openings $z_1,z_2$ are such that the pressures $p_{230},p_{240}$ passing to each of the side control shoes 233,243 are equal, in which case the control system is at an equilibrium in respect of the lateral control of the roll.

In the direction of the nip plane A—A, the roll 201 is kept in its place in a way similar to the lateral control by means of the first hydraulic valve 250, but the pressure levels between the support shoe 223 and the loading shoe 213 are varied as a function of the linear load effective in the nip N. When the nip N is run into the closed position by the effect of an outside force F (FIG. 9), for example by means of a loading cylinder, the roll 201 starts moving in the nip plane A—A, in relation to the bearing block 204, towards the loading shoe 213, in which connection the support shoe 223 and the slide 251 of the first hydraulic valve 250 coupled with said shoe 223 follow the movement of the axle 203. As a result of this, the first flow opening $x_1$ in the hydraulic valve 250 is throttled, and the second flow opening $x_2$ is opened to a greater extent, in which case the pressure $p_{220}$ passing to the support shoe 223 is reduced and, similarly, the pressure $p_{210}$ passing to the loading shoe 213 becomes higher. When the load increases, the slide 251 of the valve moves further to such an extent that an equilibrium of forces arises between the support shoe 223 and the loading shoe 213. When the linear load in the nip N corresponds to the linear load produced by the mass of the roll 201, the pressures $p_{220},p_{210}$ in the support shoe 223 and in the loading shoe 213 are equal. When the linear load in the nip N is raised further, the pressure $p_{210}$ in the loading shoe 213 is increased further, and similarly, the pressure $p_{220}$ in the support shoe 223 is reduced. By means of these pressures, the roll axle 203 is kept in its position in the nip plane A—A in relation to the bearing block 204.

Figure 11:
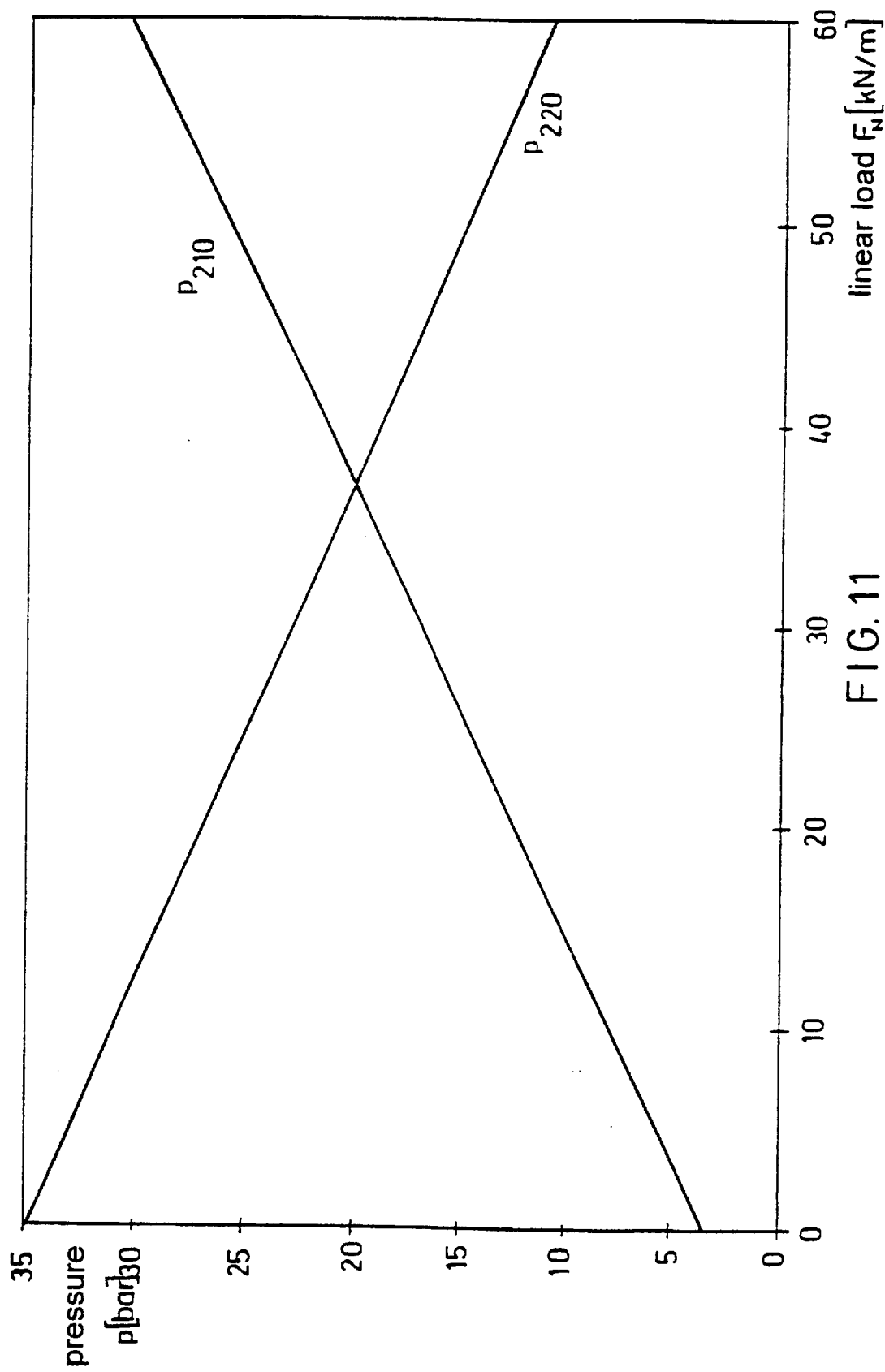
FIG. 11 shows an example illustrating the variations in the pressures of the bearing shoes of a size press roll provided with hydrostatic bearings in the way as shown in FIG. 9 as a function of the linear load in the size press nip.

For the sake of clarity of illustration, FIG. 11 is a fully schematic illustration of an example of the variations of the pressures $p_{220},p_{210}$ at the support shoe and at the loading shoe of a nip roll (size press) as a function of the linear load $F_n$ in the nip. In the illustration in FIG. 11, the pressures are varied in a fully linear way, and the state of equilibrium is maintained as the pressure of one shoe becomes higher and the pressure of the other shoe becomes lower, respectively. The variations in pressure do not have to take place in a fully linear way, but the graphs may also be curved while the differences in pressure are carried into effect in a similar way. When the linear load in the nip corresponds to the load arising from the mass of the roll, the pressures at the support shoe and at the loading shoe are equal. In a situation in which the roll nip N has been opened, the control system in accordance with the invention simply and automatically secures the necessary flow of lubricant to the bearing elements 210,220,230,240. In the direction transverse to the nip plane A—A, the operation is fully similar to that already described above as the feed pressure $p_{so}$ for lateral control is passed through the second hydraulic valve 260 to the side control shoes 233,243.

When the nip N is open and there is no linear load acting upon the nip, the load arising from the mass of the roll 201 is applied to the support shoe 223, which load attempts to shift the roll downwards in FIG. 10 towards the support shoe 223. When the support shoe 223 moves down, the slide 251 of the valve moves along with the shoe, in which connection the first flow opening $x_1$ is opened to a greater extent and, similarly, the second flow opening $x_2$ is throttled, in which connection the pressure $p_{220}$ passing to the support shoe 223 becomes higher and the pressure $p_{210}$ passing to the loading shoe 213 becomes lower. The hydraulic valve 250 is preferably dimensioned so that, irrespective of whether the nip N is open or whether there is a linear load acting upon the nip, the flow openings $x_1$, $x_2$ in the valve are not closed completely, in which case the necessary lubricant flow is secured both to the support shoe 223 and to the loading shoe 213.

Figure 12:
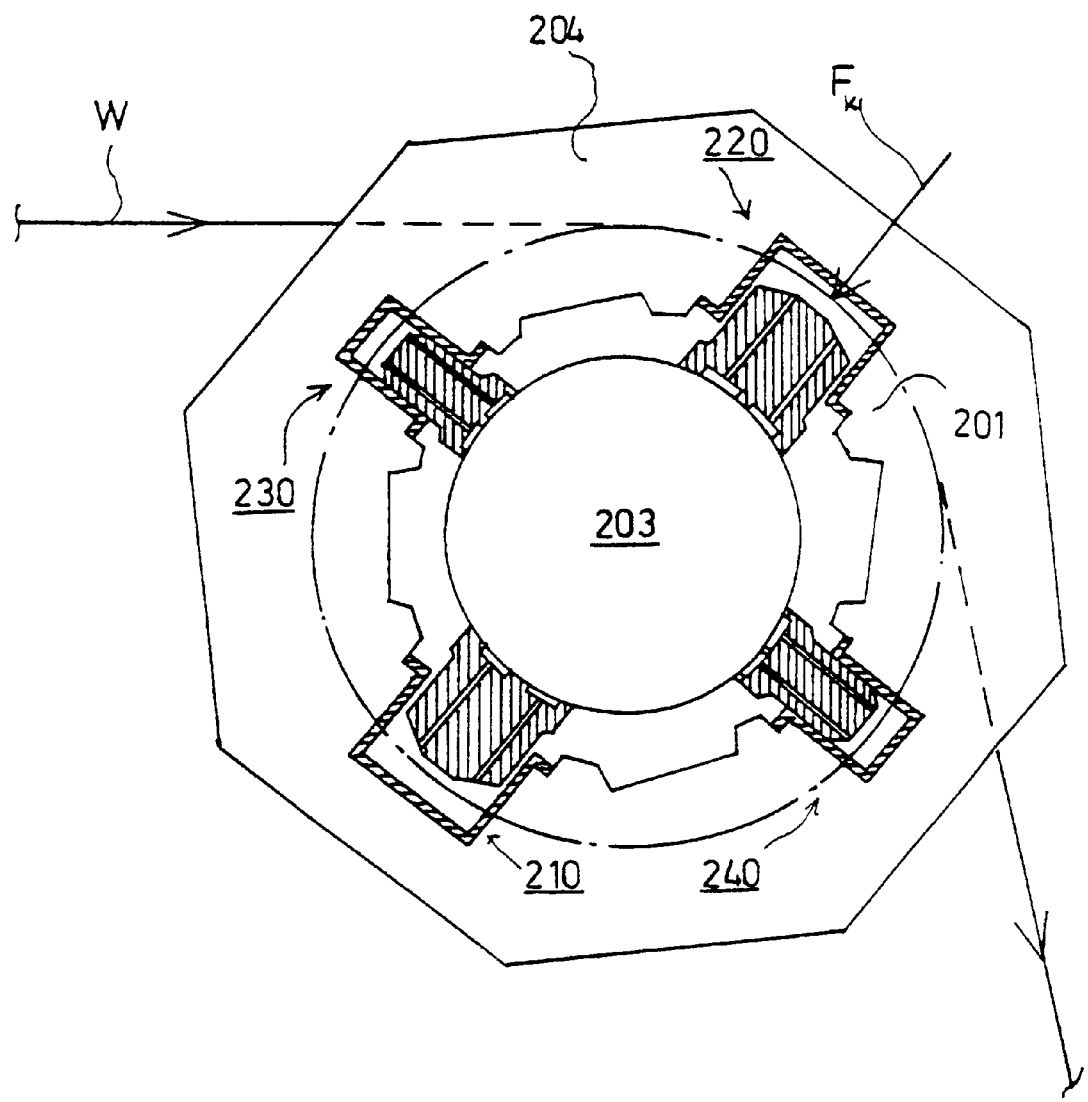
FIG. 12 is a fully schematic illustration of a glide bearing as shown in FIG. 9 at a guide roll for a web, wire or felt.

FIG. 12 is a schematic illustration of an application of the system in accordance with the invention to the journalling of a roll 201 that is used as a guide roll for a web W, a wire or a felt. The journalling of the roll 201 is fully similar to that illustrated in FIG. 9, and therefore all of the reference denotations present in FIG. 9 have not been added to FIG. 12. In the case of FIG. 12, the web W running over the roll 201 produces a load $F_k$ on the roll, and the magnitude of said load depends on the web W tension. This load $F_k$, which corresponds to the "outside force" occurring in connection with the preceding embodiment, is received by means of the bearing system and brought to an equilibrium in a way fully similar to that described above, for example, in relation to FIGS. 9 and 10.

Above, the invention has been described by way of example with reference to the figures in the accompanying drawing. The invention is, however, not confined to the exemplifying embodiment illustrated in the figures alone, but different embodiments of the invention may show variation within the scope of the inventive idea defined in the accompanying patent claims.

It is claimed:

1. A bearing control system for a roll in a paper machine or paper finishing device, the roll having a principal loading direction and an axle mountable on a frame member by hydrostatic bearing elements loadable by a pressure medium, at least one of the bearing elements acting in the principal loading direction and at least one backup bearing element acting in a direction opposite to the principal loading direction, each of the bearing elements including a bearing shoe positioned around the axle to support the axle and thus the roll rotatably in relation to the frame member, the control system comprising:

feeding means for feeding the pressure medium to the bearing elements such that the bearing shoes are positioned around the axle to enable rotation of the roll with respect to the frame member and the bearing shoes.

2. The control system of claim 1, wherein the roll forms a nip with another roll and is subjected to a linear load in the nip, said feeding means being arranged to adjust the flow of pressure medium to the bearing elements in response to a load produced by the mass of the roll and changes in the linear load.

3. The control system of claim 2, wherein said feeding means are arranged to control the flow of the pressure medium to the bearing elements in order to move the roll closer to the another roll in order to close the nip, the bearing elements including a main bearing element for generating a load against the axle in the principal loading direction, said feeding means being arranged to control the flow of pressure medium to the main bearing element to provide for a desired linear load in the nip.

4. The control system of claim 1, wherein said feeding means are arranged to control the flow of the pressure medium to the bearing elements in order to displace the axle and thus the roll in the principal loading direction.

5. The control system of claim 1, wherein the bearing elements include bearing elements arranged to apply a load against the axle in a common plane and in opposite directions, said feeding means comprising a hydraulic valve for controlling the flow of the pressure medium to said bearing elements arranged to apply a load in the common plane and in opposite directions, said hydraulic valve being arranged to distribute the pressure medium to said bearing elements such that, irrespective of an outside load applied to the roll, an equilibrium of forces arises between the bearing shoes of the bearing elements arranged to apply a load in the common plane and in opposite directions.

6. The control system of claim 5, wherein said hydraulic valve includes a movable spindle coupled to the bearing shoe of one of the bearing elements, said spindle being movable upon change in the load of the roll such that said hydraulic valve is arranged to increase the flow of pressure medium to the bearing element arranged to apply a load in a direction opposite to the principal loading direction when an outside load applied to the roll attempts to shift the roll in the principal loading direction, and reduce the flow and pressure to the bearing shoe acting in the loading direction.

7. The control system of claim 5, wherein said hydraulic valve includes a movable spindle coupled to the bearing shoe of one of the bearing elements acting in the common plane such that movement of the bearing shoe of said one of the bearing elements controls movement of said spindle and thus distribution of the flow of pressure medium to the bearing elements acting in the common plane.

8. The control system of claim 5, wherein said feeding means are arranged to control the hydrostatic bearing elements of a web, wire or felt guide roll, in which roll the primary load arises from the tension of the web, wire or felt running over the roll.

9. The control system of claim 1, wherein said feeding means are arranged to maintain a flow of lubricant through the bearing elements while the bearing elements are loaded.

10. The control system of claim 1, wherein said feeding means are arranged to control the bearing elements in a force-regulated manner.

11. The control system of claim 1, wherein said feeding means are arranged to control the bearing elements in a position-regulated manner.

12. The control system of claim 1, wherein said feeding means are arranged to remove the pressure medium from the bearing elements to cause movement of the bearing shoes out of engagement with the axle of the roll.

13. The control system of claim 12, wherein said feeding means are arranged to provide a flow of lubricant to the bearing elements when the bearing shoes are out of engagement with the axle of the roll.

14. The control system of claim 1, wherein the bearing elements include a main bearing element arranged to provide a resultant force in the principal loading direction, said feeding means being arranged to feed pressure medium having a constant pressure to the backup bearing elements.

15. The control system of claim 1, further comprising a pre-control arrangement for controlling the flow of pressure medium to said feeding means.

16. The control system of claim 1, wherein said feeding means are mechanical-hydraulic.

17. The control system of claim 1, wherein said feeding means are arranged to determine the position of the axle of the roll provided with hydrostatic bearings hydraulically by means of the bearing elements.

18. The control system of claim 1, wherein said feeding means are arranged to measure linear load in the nip by means of the bearing elements that support the roll by computing from the pressures of the pressure medium acting upon the bearing shoes, which pressures are proportional to the linear load in the nip.

19. The control system of claim 1, wherein said feeding means are electro-hydraulic.

20. The control system of claim 19, wherein the bearing elements include a main bearing element arranged to provide a resultant force in the principal loading direction, said feeding means being arranged to measure the position of the main bearing element electrically and to regulate the loading pressure based on the measurement data.

21. The control system of claim 19, wherein said feeding means are arranged to time and synchronize movements of the roll at opposite sides of the roll.

22. The control system of claim 1, wherein said feeding means are arranged to keep the thickness of the fluid film on the hydrostatic bearing substantially constant irrespective of the load applied to the roll.

* * * * *